United States Patent
Mikulski et al.

(10) Patent No.: US 9,692,757 B1
(45) Date of Patent: Jun. 27, 2017

(54) ENHANCED AUTHENTICATION FOR SECURE COMMUNICATIONS

(71) Applicant: Amazon Technologies, Inc., Seattle, WA (US)

(72) Inventors: Andrew Paul Mikulski, Seattle, WA (US); Nicholas Alexander Allen, Seattle, WA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 14/717,937

(22) Filed: May 20, 2015

(51) Int. Cl.
*H04L 29/06* (2006.01)
*H04L 9/32* (2006.01)
*G06F 7/04* (2006.01)
*G06F 15/16* (2006.01)
*G06F 17/30* (2006.01)

(52) U.S. Cl.
CPC ........ *H04L 63/0876* (2013.01); *H04L 9/3247* (2013.01); *H04L 63/0457* (2013.01); *H04L 63/061* (2013.01)

(58) Field of Classification Search
None
See application file for complete search history.

(56) References Cited

U.S. PATENT DOCUMENTS

| | | | | |
|---|---|---|---|---|
| 6,377,691 | B1* | 4/2002 | Swift | H04L 63/04 380/277 |
| 2005/0210247 | A1* | 9/2005 | Ong | H04L 63/08 713/168 |
| 2007/0123304 | A1* | 5/2007 | Pattenden | G06F 1/26 455/557 |
| 2011/0145900 | A1* | 6/2011 | Chern | H04L 9/3271 726/7 |
| 2012/0090028 | A1* | 4/2012 | Lapsley | H04L 63/08 726/22 |
| 2014/0331049 | A1* | 11/2014 | Duby | H04L 63/08 713/171 |
| 2016/0094531 | A1* | 3/2016 | Unnikrishnan | G06F 21/30 726/7 |
| 2016/0105290 | A1* | 4/2016 | Khalil | H04L 9/3271 713/176 |

OTHER PUBLICATIONS

Lehtinen, S., and C. Lonvick, "The Secure Shell (SSH) Protocol Assigned Numbers," Request for Comments: 4250, Standards Track, Jan. 2006, 19 pages.

(Continued)

*Primary Examiner* — Shin-Hon Chen
(74) *Attorney, Agent, or Firm* — Davis Wright Tremaine LLP

(57) ABSTRACT

A server obtains a challenge from another computer system during a negotiation with a client according to a protocol. The server injects the challenge into a message of the protocol to the client. The client uses the challenge in an authentication request. The server submits the authentication request to the other computer system for verification. The other computer system verifies the authentication request using a key registered to the client. The server operates further dependent at least in part on whether verification of the authentication request was successful.

23 Claims, 8 Drawing Sheets

(56) References Cited

OTHER PUBLICATIONS

Ylonen, T., and C. Lonvick, "The Secure Shell (SSH) Protocol Architecture," Request for Comments: 4251, Standards Track, Jan. 2006, 28 pages.
Ylonen, T., and C. Lonvick, "The Secure Shell (SSH) Authentication Protocol," Request for Comments: 4252, Standards Track, Jan. 2006, 16 pages.
Ylonen, T., and C. Lonvick, "The Secure Shell (SSH) Transport Layer Protocol," Request for Comments: 4253, Standards Track, Jan. 2006, 30 pages.
Ylonen, T., and C. Lonvick, "The Secure Shell (SSH) Connection Protocol," Request for Comments: 4254, Standards Track, Jan. 2006, 23 pages.
Schlyter, J., and W. Griffin, "Using DNS to Securely Publish Secure Shell (SSH) Key Fingerprints," Request for Comments: 4255, Standards Track, Jan. 2006, 9 pages.
Cusack, F., and M. Forssen, "Generic Message Exchange Authentication for the Secure Shell Protocol (SSH)," Request for Comments: 4256, Standards Track, Jan. 2006, 12 pages.
Galbraith, J., and P. Remaker, "The Secure Shell (SSH) Session Channel Break Extension," Request for Comments: 4335, Standards Track, Jan. 2006, 6 pages.
Bellare, M., et al., "The Secure Shell (SSH) Transport Layer Encryption Modes," Request for Comments: 4344, Standards Track, Jan. 2006, 12 pages.
Harris, B., "Improved Arcfour Modes for the Secure Shell (SSH) Transport Layer Protocol," Request for Comments: 4345, Standards Track, Jan. 2006, 5 pages.
Friedl, M., et al., "Diffie-Hellman Group Exchange for the Secure Shell (SSH) Transport Layer Protocol," Request for Comments: 4419, Standards Track, Mar. 2006, 10 pages.
Harris, B., "RSA Key Exchange for the Secure Shell (SSH) Transport Layer Protocol," Request for Comments: 4432, Standards Track, Mar. 2006, 8 pages.
Hutzelman, J., et al., "Generic Security Service Application Program Interface (GSS-API) Authentication and Key Exchange for the Secure Shell (SSH) Protocol," Request for Comments: 4462, Standards Track, May 2006, 28 pages.
Galbraith, J. and R. Thayer, "The Secure Shell (SSH) Public Key File Format," Request for Comments: 4716, Nov. 2006, 11 pages.
Galbraith, J., et al., "Secure Shell Public Key Subsystem," Request for Comments: 4819, Standards Track, Mar. 2007, 18 pages.
Igoe, K., and J. Solinas, "AES Galois Counter Mode for the Secure Shell Transport Layer Protocol," Request for Comments: 5647, Informational, Aug. 2009, 10 pages.
Stebiula, D., and J. Green, "Elliptic Curve Algorithm Integration in the Secure Shell Transport Layer," Request for Comments: 5656, Standards Track, Dec. 2009, 19 pages.
Igoe, K., and D. Stebila, "X.509v3 Certificates for Secure Shell Authentication," Request for Comments: 6187, Standards Track, Mar. 2011, 17 pages.
Igoe, K., "Suite B Cryptographic Suites for Secure Shell (SSH)," Request for Comments: 6239, Informational, May 2011, 15 pages.
Sury, O., "Use of the SHA-256 Algorithm With RSA, Digital Signature Algorithm (DSA), and Elliptic Curve DSA (ECDSA) in SSHFP Resource Records," Request for Comments: 6594, Standards Track, Apr. 2012, 9 pages.
Bider, D., and M. Baushke, "SHA-2 Data Integrity Verification for the Secure Shell (SSH) Transport Layer Protocol," Request for Comments: 6668, Standards Track, Jul. 2012, 6 pages.
Roth, G.B., et al., "Virtual Service Authorization," U.S. Appl. No. 14/576,141, filed Dec. 18, 2014.
Roth, G.B., et al., "Complete Forward Access Sessions," U.S. Appl. No. 13/944,579, filed Jul. 17, 2013.
"MS-CHAP," Wikipedia, The Free Encyclopedia, Jul. 29, 2013, <http://en.wikipedia.org/wiki/MS-CHAP> [retrieved May 21, 2015], 2 pages.
"Layer 2 Tunneling Protocol," Wikipedia, The Free Encyclopedia, Dec. 25, 2014, <http://en.wikipedia.org/wiki/Layer_2_Tunneling_Protocol> [retrieved May 21, 2015], 7 pages.

* cited by examiner

ENHANCED AUTHENTICATION FOR SECURE COMMUNICATIONS

BACKGROUND

Various techniques have been developed to improve the security of information accessible via computer networks. Various protocols for cryptographically protected communications sessions, for instance, provide mechanisms to ensure the confidentiality and/or integrity of data passing between two devices on a network. At the same time, computer systems themselves have become more sophisticated. A distributed computer system, for instance, may comprise multiple individual computer systems that communicate over a network, each playing a particular role in the distributed computer system. Moreover, services provided by distributed computer systems can involve complex orchestration among multiple individual computer systems. While many conventional protocols for cryptographically protected communications sessions provide high levels of security between pairs of computer systems, their use in such distributed computer systems can be highly complex and cumbersome to manage due to the number of computer systems involved.

BRIEF DESCRIPTION OF THE DRAWINGS

Various embodiments in accordance with the present disclosure will be described with reference to the drawings, in which.

DETAILED DESCRIPTION

Figure 1:
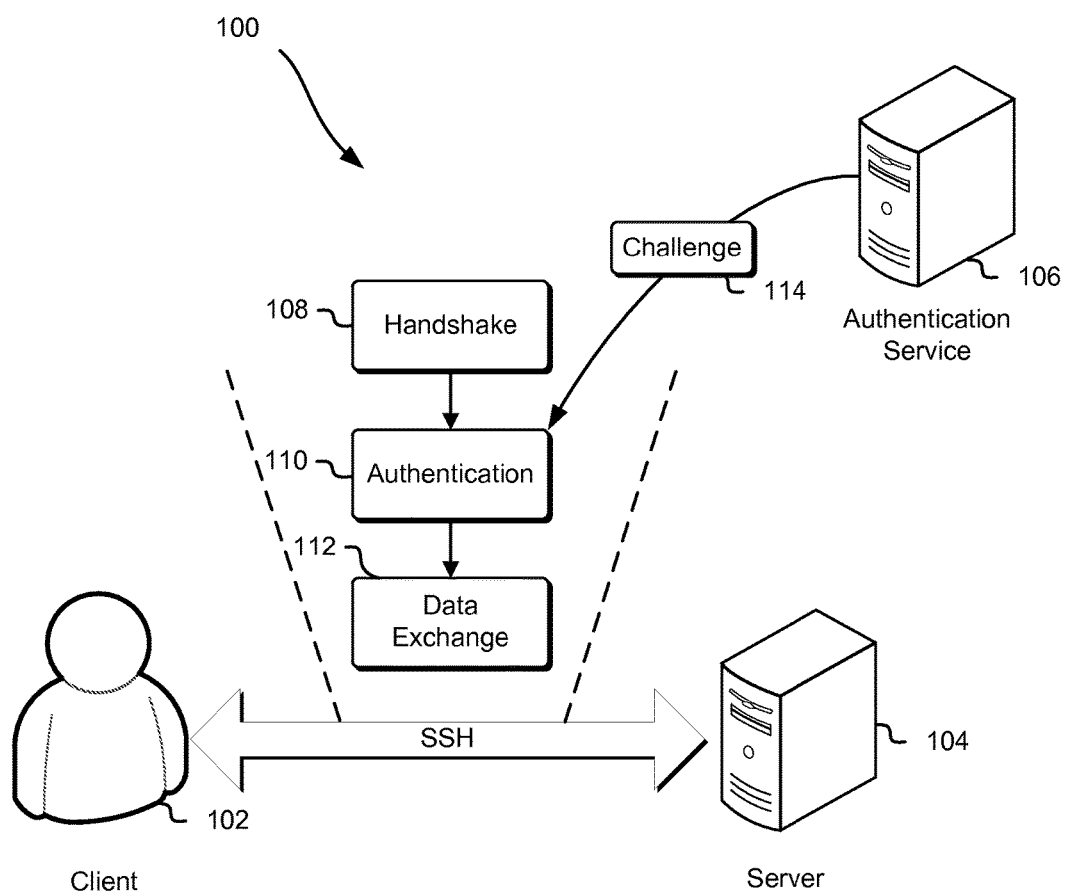
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include techniques for providing enhanced security involving communications over secure shell (SSH) and similarly configured cryptographically protected communications sessions. In an embodiment, a client authenticates with a server in a process that involves an additional third party computer system, referred to as an authentication service. In various implementations, the client computer system has access to a secret that the client can use to generate digital signatures that are verifiable by the authentication service. The secret may be, for instance, a private cryptographic key that has a corresponding public cryptographic key that the authentication service is configured to trust. In other examples, the secret is a symmetric cryptographic key that is shared with the authentication service.

In some implementations, a client and server establish a transmission control protocol (TCP) connection and, once the TCP connection is established, begin negotiating an SSH session. During this negotiation, the server obtains a challenge from an authentication service. In some examples, the challenge includes a timestamp and a digital signature that the authentication can use to verify that the challenge is unmodified when later presented with the challenge. The server then provides the challenge to the client during the SSH session negotiation. For instance, the server may populate a comment field of an identification string that the server then sends to the client. The server and client may perform an algorithm negotiation and key exchange to establish a cryptographically protected communications channel.

Once the cryptographically protected communication channel has been established, the client may attempt to authenticate to the server. To do this, the client may use its secret to digitally sign the challenge and include the digitally signed challenge in an authentication request made to the server. As a result of receiving the authentication request, the server may submit the digitally signed challenge to the authentication service for verification. The authentication service may perform a series of verifications on the digitally signed challenge including: using the timestamp to verify that the challenge is sufficiently recent, verifying the client-generated digital signature, and verifying the authentication service-generated digital signature. If all verifications are successful, the authentication service may transmit a message to the server indicating that the client has been successfully authenticated. If any of the verifications fail, the authentication service may transmit a message to the server indicating that authentication of the client has failed.

In circumstances where the authentication service indicates that the client has been successfully authenticated, additional information may be provided to the server. In some examples, the authentication service provides a forward access session token that serves as a cryptographically verifiable indication that the server is authorized to submit requests on behalf of the client to other services. In this manner, the server can include the forward access session token in requests that the server makes on behalf of the client and, as a result of inclusion of the forward access session token, assuming any other applicable conditions regarding authorization/authentication are met, such requests may be fulfilled. In other words, without such a forward access session, at least some types of requests that the server is configured with the ability to make on behalf of the client would be denied.

FIG. 1 shows an illustrative example of an environment 100 in which various embodiments can be implemented. In FIG. 1 a client 102 and a server 104 communicate over a network, such as the Internet or another network, such as listed below. As part of establishing an SSH session, which involves participation from an authentication service 106. The client 102 and the server 104 may be computer systems operating on respective computing devices where the computing devices are configured (e.g., with software that configures hardware and/or with specialized hardware) to perform various operations such as described herein. The authentication service 106 may be a computer system (which may be a distributed computer system) configured to perform various operations described herein, such processing requests to verify digital signatures, generating forward access session tokens, obtaining applicable policies, and/or other operations, some of which are discussed in more detail below. The authentication service 106 may provide an application programming interface (API), such as a web service interface, through which the server 104 can submit requests to be fulfilled by the authentication service 106. Note that, in some embodiments the server 104 and the authentication service 106 are components of the same distributed computer system that is controlled by a single entity (e.g., a service provider that provides services accessible through the server 104), although in various embodiments, the server 104 and the authentication service 106 are controlled by separate entities, such as different service providers. In some examples, the authentication service is operated by the same entity that operates the client, while the server 104 is operated by a different entity. For example, the client 102 and the authentication service 104 may both operate in a data center of a customer of a service provider and the server 104 may operate in a data center of the service provider. Other examples are also considered to be within the scope of the present disclosure.

In an embodiment, to establish the SSH session, the client 102 and server 104 communicate over a series of phases that include a handshake phase 108, an authentication phase 110, and a data exchange phase 112. In the handshake phase 108, the client 102 may negotiate various parameters of the SSH session, such as the version of the SSH protocol to use, algorithms to use, cryptographic keys for cryptographically protecting communications, and the like. In the authentication phase, the client authenticates to the server using a secret credential (referred to as a "secret" above) whose use is verifiable by the authentication service 106. As noted above, the credential may be a cryptographic key, such as a private cryptographic key that has a respective public cryptographic key (also referred to as a public key) that the authentication service 106 is configured to trust or a symmetric cryptographic key (also referred to as a symmetric key) the authentication service 106 is configured to trust. Note that a system (e.g., the authentication service 106) is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key (e.g., where the digital signature is a message authentication code (MAC) such as a hash-based message authentication code (HMAC)) is successful.

During the handshake phase, in some embodiments, the client 102 may be provided with a challenge 114 generated by the authentication service 106. For example, the server 104 may request the challenge 114 from the authentication service 106 and provide the challenge in a field of a message compliant with a message configured according to an SSH protocol, although the challenge may be provided in a manner that is not compliant with an SSH protocol in some embodiments. Such a flow may be utilized, for instance, when the authentication service 106 is not accessible to the client 102 (e.g., because the authentication service 106 is not accessible via a public network). In other examples, the client 102 may be able to obtain the challenge 114 directly from the authentication service 106, such as when the authentication service has a publicly accessible API (e.g., accessible via the Internet).

During the authentication phase 110, as illustrated by the arrow between the authentication service 106 and the authentication phase 110, the client 102 may use the challenge 114 for authentication. For instance, the client may use its credential to digitally sign the challenge 114 or otherwise cryptographically prove possession of the credential (e.g., by using the credential to encrypt the challenge 114), thereby generating cryptographic proof of possession of the credential (e.g., the challenge with a digital signature of the challenge, or encrypted information that encrypts the challenge). The client may then pass the cryptographic proof to the server 104 for authentication. The server 104 may provide the cryptographic proof from the client 102 to the authentication service 106 (e.g., via an API call, also referred to as an API request, which is a form of a request) for verification.

The authentication service 106 then verifies the cryptographic proof (e.g., as discussed in more detail below) and provides a response to the server 104 that indicates whether the cryptographic proof was successfully verified and that provides a forward access session token that enables the server 104 to make API calls to other services on behalf of the client 102.

Dependent on the response from the authentication service 106, the server 104 may operate accordingly during the data exchange phase 112. The operations performed during the data exchange phase 112 may depend on the specific services being provided by the server 104. For example, during the data exchange 112, the client 102 may submit API calls to the server 104 to be fulfilled by the server 104, where fulfillment may include the server 104 and/or another server operating in conjunction with the server 104 making calls to one or more other services on behalf of the client 102. As noted above, the forward access session token may be information that enables the client 102 to submit, to other services, requests on behalf of the client 102. The forward access session token may have a digital signature that is verifiable by the authentication service 106 such that another service that receives a request with the forward access session token from the server 104 can submit the forward access session token to the authentication service 106 for verification. In some embodiments, the forward access session token is configured such that such verification can be made without a separate request made to the authentication service 106. The forward access session token may be encoded with various information, such as an expiration value indicating a time when the forward access session token expires, any applicable conditions for use, and other information and modifiability of such information can be prevented using a digital signature and/or encryption. Example techniques for such tokens are described in U.S. patent application Ser. No. 13/944,579, filed Jul. 17, 2013, which is incorporated herein by reference and which uses "service-wide information" and "service-specific information" to refer to examples of such forward access session tokens.

Note that the techniques described herein are applicable to other contexts in addition to those illustrated in the drawings. For instance, in some examples, A user uses SSH to remotely log into a computer system, such as a virtual or other computer system hosted by a computing resource service provider and programmatically managed by a customer of the service provider using API calls to a service of the service provider that provides such computer systems. The computer system into which the user uses SSH to log into may be configured to employ techniques described herein, such as by communicating with an authentication service to obtain a challenge, provide the challenge to the user (i.e., to a computer system operated by the user) in a message of an SSH handshake, and transmit a digital signature and protocol transcript to the authentication service for verification. The authentication service may, as a result of successful verification of the digital signature, provide a forward access session token to enable the computer system to make API calls on behalf of the user, where the API calls may be made pursuant to user input provided to the computer system over the SSH session that is established between the user's local computer system and the remote computer system into which the user logged in. Note also that, a forward access session token is an example of a credential that can be used to enable one entity to operate (e.g., submit requests) on behalf of another. Another example such credential is a cryptographic key and, generally, any information usable as a credential may be used in various embodiments.

In various embodiments, the techniques described herein allow for enhanced data security while still allowing clients to utilize existing SSH implementations. In other embodiments, clients may be configured to perform advanced operations that further enhance data security. For example, a client may be configured to verify a set of parameters of a challenge to determine validity of the challenge and, if unable to successfully verify validity of the challenge, perform a mitigating action, such as ceasing to complete the handshake. As an example, a client may check a timestamp in the challenge to determine whether the timestamp indicates a time that is within a threshold of a current time. If the timestamp indicates a time that is outside of the threshold (or is otherwise invalid, such as being in the future), the client may take a mitigating action.

Figure 2:
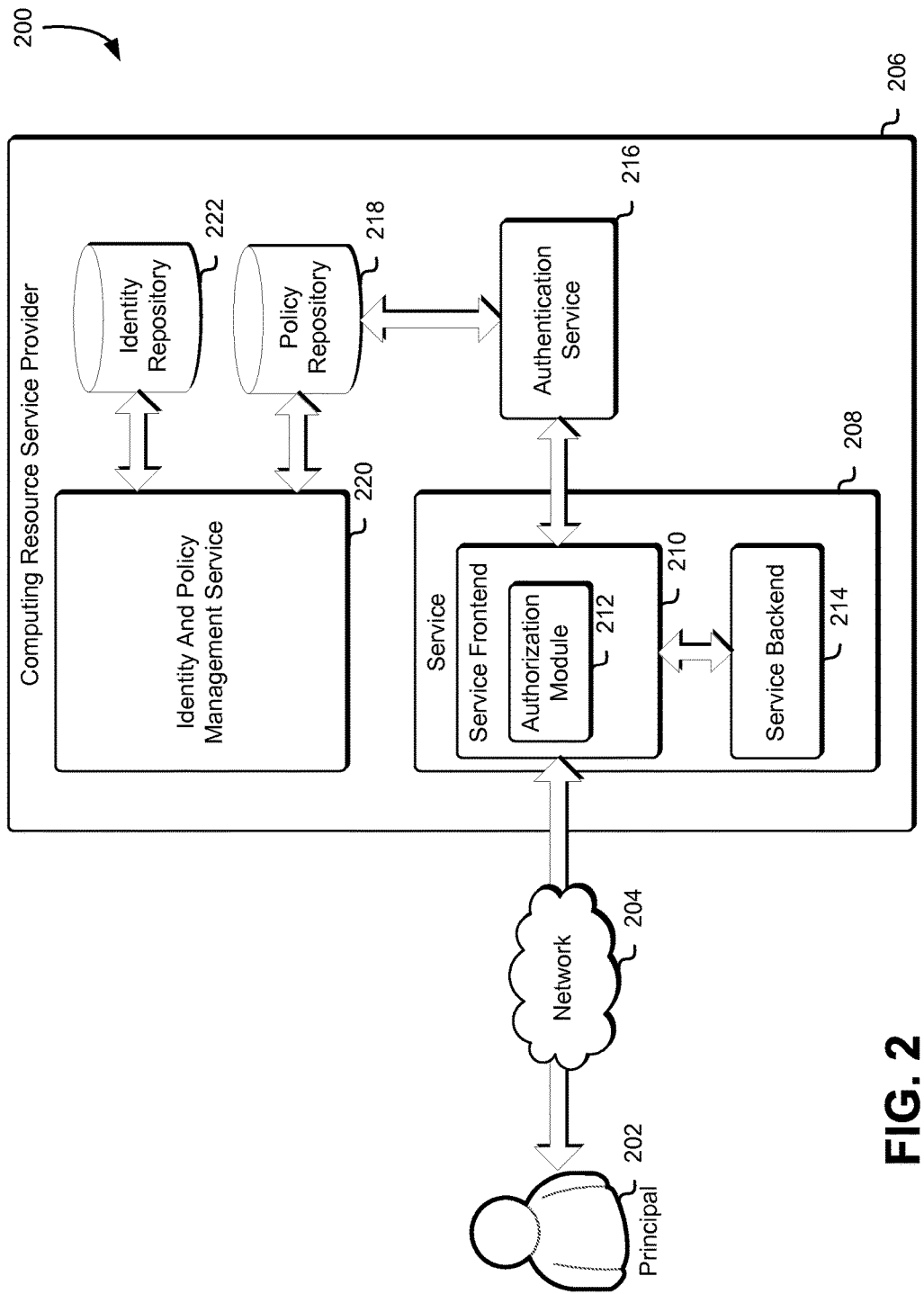
FIG. 2 shows an illustrative example of an environment which may incorporate the environment of FIG. 1.

FIG. 2 is an illustrative example of an environment 200 in which a distributed computer system may utilize the various techniques described herein. In an embodiment, a principal 202 may use a computing device (e.g., the client 102 described above in connection with FIG. 1) to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may, through an associated computing device, establish an SSH session and issue a request for access to a service 208 (and/or a request for access to resources associated with the service 208) provided by a computing resource service provider 206. The request for access may be, for instance, a request to access a resource and/or a request to authenticate as part of an SSH protocol negotiated between the computing device of the principal 202 and the service frontend 210. The request may be, for instance, a web service application programming interface request (referred to more succinctly as a web service request). The principal may be a user, or a group of users, or a role associated with a group of users, or a process representing one or more of these entities that may be running on one or more remote (relative to the computing resource service provider 206) computer systems, or may be some other such computer system entity, user, or process such as the client 102 described above in connection with FIG. 1. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections) over an SSH session established using various techniques described herein. The principal 202 may use a computing device (also referred to as a client device) to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups for computing resources (e.g., VM instances, file-based database storage systems, block storage services, redundant data storage services, data archive services, data warehousing services, user access management services, identity and/or policy management services, content management services, and/or other such computer system services). Other example resources include, but are not limited to user resources, policy resources, network resources, public cryptographic keys, private cryptographic keys, symmetric cryptographic keys, and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. In some embodiments, the web server employs techniques described herein synchronously with processing the requests. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202.

However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by an identity and policy management service 220. The identity and policy management service 220 may be a service accessible via API to customers of the service provider 206 for the purpose of managing policies on computing resources and managing identities associated with customer accounts. Identities may be assigned for various purposes, such as users, roles, groups, computer systems, and the like.

The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request).

Having obtained any policies applicable to the request, the authentication service 216 may provide an authentication response and, if applicable, the obtained policies back to the service frontend 210. The authentication response may indicate whether the response was successfully authenticated and, in some examples, may include a forward access session token. The service frontend 210 may then check whether the fulfillment of the request for access to the service 208 would comply with the obtained policies using an authorization module 212. Note that, in some embodiments, a policy may be configured such that, whether fulfillment of a request violates the policy depends on whether a violation of a uniqueness constraint has occurred. For instance, some data may be considered to be less sensitive than other data and requests for the less sensitive data may be fulfilled despite a detected violation of a uniqueness constraint while access to the more sensitive data may require that a uniqueness constraint violation not have occurred in connection with a public key specified to be used in authentication of requests. Similar techniques may be employed for other types of computing resources, such as computing devices, storage locations, collections of data, identities, policies, and the like.

An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the identity and policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by selecting the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service (e.g., comprising one or more application servers, data storage servers, database servers, and/or other devices) configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Further, as noted above, if fulfillment of the request for access to the service 208 complies with the applicable obtained policies, the service frontend 210 may generate and submit one or more requests to one or more other services of the computing resource service provider 206 to cause the one or more other services to perform one or more requested operations on behalf of the principal 202.

As illustrated in FIG. 2, the identity and policy management service has an identity repository 222 that may be a data storage system used to store identities of customers of the service provider 206 in association with respective data, such as information about the identities, groups identities belong to, demographic information, and/or other information. In some examples, customers, through API calls to the identity and policy management service (which may be configured similarly to the service 208 with a respective frontend and backend), to manage (e.g., add, delete, change) identities associated with their respective accounts with the service provider 206.

In some examples, a customer may utilize API calls to the identity and policy management service 220 to associate public cryptographic keys with respective identities to enable those identities to use their respective cryptographic keys to access various services of the computing resource service provider 206. In some examples, an API call to associate a public cryptographic key with an identity allows for assignment of a key identifier (which may be a fingerprint of a digital certificate that encodes the public cryptographic key or another identifier, such as a sequence number or random number) through the API call or automatically as part of fulfillment of the API call. Use of an identifier that is different from a fingerprint (i.e., a public value) allows for less frequent denial of service attacks by attaching the fingerprint to other identities, thereby preventing use of the public key. In some examples, a customer can assign different identifiers to the same public cryptographic key, e.g., to enable identities to utilize the same smart card or other device with the corresponding private cryptographic key to utilize the device in multiple contexts and to enable independent management of applicable policy in different contexts (e.g., in different test accounts for different development environments). The identifier may be used to specify policy (e.g., through API calls) on how the public cryptographic key can be used by the identity. For example, a policy may specify a permission that allows the identity to use the public key to make authentication requests as part of an authentication phase of an SSH protocol.

The identity and policy management service 220 also allows for management of public cryptographic keys. For example, the identity and policy management service 220 may be configured such that a result of deletion of an identity results in an inability to use any associated public cryptographic keys for access to computing resources of a customer that deleted the identity or other access for which use of the public key was usable to verify authorization. Further, policies can be used to control authorization for use of public cryptographic keys for custom requests supported by the service provider 206, such as described in U.S. patent application Ser. No. 14/576,141, titled "Virtual Service Authorization" which is incorporated herein by reference.

Figure 3:
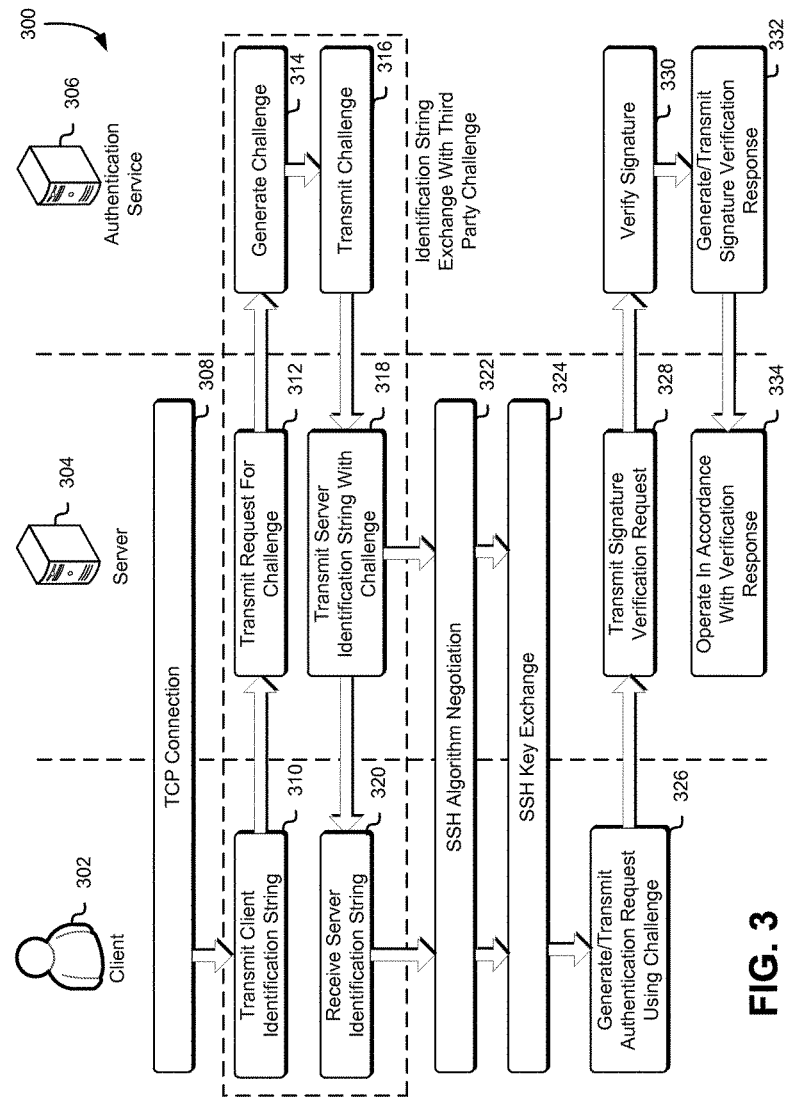
FIG. 3 shows a diagram illustrating communications between various entities involved in implementing various aspects of the present disclosure in accordance with an embodiment.

FIG. 3 shows a diagram 300 illustrating communications among a client 302, a server 304, and an authentication service 306. As illustrated in FIG. 3, the client 302 and the server 304 may establish 308 a TCP connection in accordance with the transmission control protocol to enable the establishment of an SSH session. Note that, while a TCP connection and SSH are used for the purpose of illustration of specific protocols, the techniques of the present disclosure can be adapted for use in other protocols. Note also that the examples used herein may be performed in compliance with one or more of: Request for Comments (RFC) 4250, RFC 4251, RFC 4252, RFC 4253, RFC 4254, RFC 4255, RFC 4256, RFC 4335, RFC 4344, RFC 4345, RFC 4419, RFC 4432, RFC 4462, RFC 4716, RFC 4819, RFC 5647, RFC 5656, RFC 6187, RFC 6239, RFC 6594, and RFC 6668, which are incorporated by reference.

Next, as illustrated in FIG. 3, the client 302 and server 304 perform an identification string exchange with a third party (i.e., authentication service, in this example) challenge, where the identification string exchange is indicated by the box having a dashed-line perimeter. The identification string exchange begins, in an embodiment, with the client 302 transmitting 310 a client identification string to the server 304. Upon receipt of the client identification string transmitted 310 by the client 302 (or at another time, which may be triggered by initiation or completion of the TCP connection handshake or another event), the server 304 may transmit 312 a request for a challenge to the authentication service 306. The request for the challenge may be, for instance, an API call to the authentication service 306. The request may further be digitally signed so as to be verifiable by a cryptographic key (e.g., public cryptographic key or symmetric cryptographic key) that the authentication service 306 is configured to trust. In addition, the request may be transmitted over a cryptographically protected communications session, such as an SSH session or a Secure Sockets Layer (SSL)/Transport Layer Security (TLS) session, to ensure confidentiality and/or integrity of the request.

If any/all conditions for fulfillment of the request (e.g., successful authentication of the request for a challenge and/or fulfillment of the request being authorized by any applicable policy), the authentication service 306 may generate 314 or otherwise obtain (e.g., from memory or another service that generates or otherwise obtains challenges) a challenge. An example challenge is discussed below in connection with FIG. 5. The authentication service 306 may then transmit 316 the challenge to the server 304. The server 304 may then use the received challenge to generate and transmit an identification string that has the challenge. In an embodiment, the identification string has the format:

SSH-protoversion-softwareversion SP comments CR LF

In this example, "protoversion" refers to the version of the SSH protocol to be used, "SP" refers to a "space" character (ASCII 32), "CR" refers to a carriage return (ASCII 13), and "LF" refers to a single line feed character (ASCII 10). The "softwareversion" field refers to a value used to trigger compatibility extensions and to indicate capabilities of an SSH implementation. In an embodiment, the "comment" field consists of or otherwise comprises the challenge. In another embodiment, the "softwareversion" field consists of or otherwise comprises the challenge. In yet another example, the challenge can be included in a ServerRandom field, such as by using the challenge as input into a pseudorandom function (PRF) to obtain a value for the ServerRandom field. The ServerRandom field may be, for example, the cookie field in the SSH_MSG_KEXINIT packet.

Once the client 302 receives 320 the server identification string, it can store the challenge (e.g., by storing the server identification string and/or parsing the server identification string to obtain the challenge and storing the obtained challenge) for later use in authentication after the client 302 and the server 304 perform an SSH algorithm negotiation 322 and then an SSH cryptographic key exchange 324 to establish a cryptographically protected communications session. The cryptographic key exchange, in some examples, is an RSA cryptographic key exchange for the SSH transport layer protocol as described in RFC 4432, although other key exchanges are considered as being within the scope of the present disclosure.

Once the cryptographic key exchange 324 has completed, the client 302 may generate and transmit 326 an authentication request using the challenge. In an embodiment, the authentication request includes an authentication claim that includes the following data and a digital signature calculated over the following data, where the data is in the following order:

String session identifier
byte SSH_MSG_USERAUTH_REQUEST
string user name
string service name
string "publickey"
boolean TRUE
string public key algorithm name
string public key to be used for authentication The "session identifier," in this example is computed as:

$$H=\text{hash}(V\_C\|V\_S\|I\_C\|I\_S\|K\_S\|e\|f\|K)$$

where the inputs to H are as follows, referred to individually as session identifier components or collectively as a protocol transcript:

string V_C, the client's identification string (CR and LF excluded)
string V_S, the server's identification string (CR and LF excluded)
string I_C, the payload of the client's SSH_MSG_KEXINIT
string I_S, the payload of the server's SSH_MSG_KEXINIT
string K_S, the host key
mpint e, exchange value sent by the client
mpint f, exchange value sent by the server
mpint K, the shared secret.

Note that the data types of "byte" and "mpint" are defined in RFC 4432. Also note that "user name" may be an identifier of the public key used by a service provider that manages, among other resources, public cryptographic keys. Note also that authentication claims may be configured differently, such as by including a digital signature computed directly over the challenge (i.e., where the challenge is input into the cryptographic algorithm for generating the digital signature) instead of indirectly (i.e., where a value, such as a hash, that is derived based at least in part on the challenge is input into the cryptographic algorithm). Note however that the above example is particularly useful as allowing for compliance with the various SSH specifications with little or no modification to SSH code libraries used by client computer systems.

Once the client 302 generates and transmits 326 the authentication request, the server 304 may receive the authentication request, which may trigger the server 304 to generate and transmit 328 a signature verification request to the authentication service 306. The signature verification request may be digitally signed by the server 304 to enable the authentication service 306 to determine that fulfillment of the signature verification request is authorized (e.g., because it was submitted by an authorized entity from a set of authorized entities that includes the server 304). To enable the authentication service 306 to verify the digital signature, the signature verification request may comprise the authentication claim from the client 302 (e.g., the digital signature and the data over which the digital signature was calculated, e.g., the protocol transcript) and the session identifier components. Note that, in embodiments where the challenge is embedded into the server identification string, because the protocol transcript includes the server's identification string, it also includes the challenge. Note also, however, that the challenge could be embedded into another component of the protocol transcript in other embodiments. Further, the server 304 may provide not the protocol transcript or other data over which the digital signature was generated, but other information that the authentication service can use to generate or otherwise determine the data over which the digital signature was generated. For instance, because some messages may comply with a protocol, various components of messages can be condensed into smaller pieces of information that represent the components (e.g., a string that occurs in every message of a particular type (e.g., ClientHello and/or Identification String) of the messages and the server can map the smaller pieces of information to the components to determine the data over which the digital signature was generated.

The authentication service 306 may verify 330 the digital signature of the data and perform any additional verifications involved in verification. In an embodiment, the authentication service 306 verifies that the V_S from the session identifier components contains a valid challenge that is fresh. The validity of the challenge may be checked by verifying a digital signature of the challenge that was generated by the authentication service or another entity which the authentication service 306 is configured to trust. The challenge may be considered fresh if the authentication service 306 determines that the challenge was created sufficiently recently (e.g., within some threshold time of a current time). The authentication service may also independently calculate H, as above, and verify that the session identifier matches H. In some embodiments, the authentication service 306 determines whether the "user name" corresponds to a valid cryptographic key in an identity and policy management service, such as described above. Another check that the authentication service 306 may make includes determining whether the type of the cryptographic key used matches the "public key algorithm," such as by determining if the cryptographic key has a sufficient number of bits.

Having verified the digital signature, the authentication service 306 generates and transmits 332 a signature verification response. If the digital signature of the authentication request was unsuccessfully verified (e.g., one or more conditions for successful verification failed), the signature verification response may indicate unsuccessful verification. If the digital signature of the authentication request was successfully verified, the signature verification response may indicate successful verification and may also include additional information, such as a forward access session token.

The server may then receive 334 the verification response and operate accordingly. For example, if the verification response indicates that the digital signature of the authentication request was unsuccessfully verified, the server 304 may transmit an SSH_MSG_USERAUTH_FAILURE message of byte datatype to the client 302. Additional operations that may be performed include, but are not limited to, discontinuing the SSH session with the client 302, rejecting any requests sent by the client 302, transmitting one or more notifications, leaving the SSH session open to allow the client 302 to attempt to authenticate again (perhaps subject to some limit on the number of times the client 302 can submit an authentication request), and/or performing any additional operations. If the verification response indicates that the digital signature of the authentication request was successfully verified, the server may allow processing of requests submitted over the SSH session from the client 302 (which may be subject to further checks on authentication/authorization, such as compliance with applicable policy, such as described above).

Figure 4:
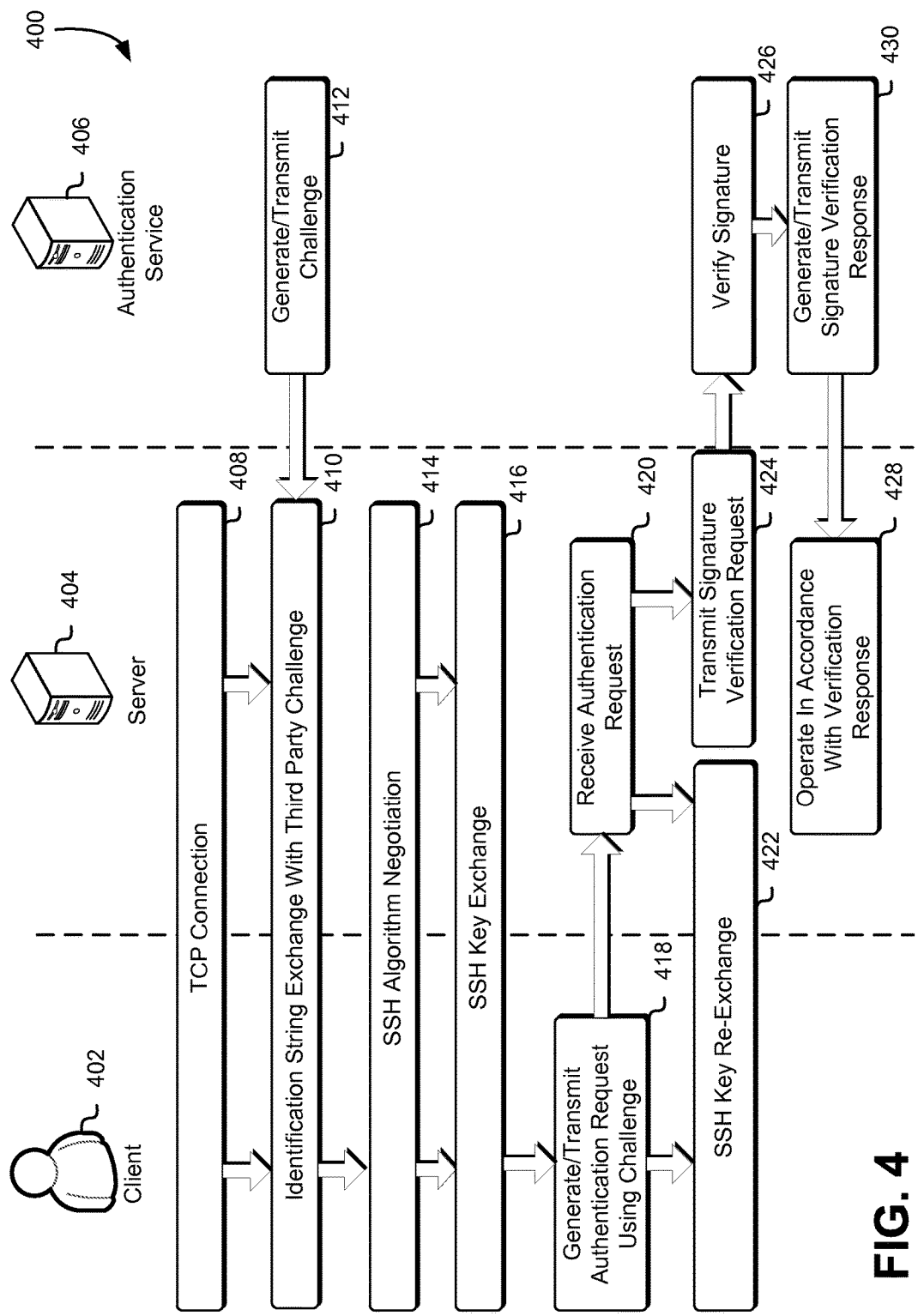
FIG. 4 shows a diagram illustrating communications between various entities involved in implementing various aspects of the present disclosure in accordance with another embodiment.

FIG. 4 shows a diagram illustrating communications among a client 402, a server 404, and an authentication service 406, such as described above. In this example, as described in more detail below, additional operations are performed to prevent the authentication service 406 from having the ability to eavesdrop on communications between the client 402 and the server 404, such as to additionally enhance data security and/or when the authentication service 406 is not sufficiently trusted to be privy to communications between the client 402 and server 404. Specifically, additional operations are performed to perform another key exchange so that, when data is provided to the authentication service 406 to verify a signature of the authentication request, which may enable the authentication service 406 to access the negotiated key, the client 402 and server 406 begin using a new key that the authentication service does not have access to.

As illustrated in FIG. 4, the client 402 and server 404 establish 408 a TCP connection and perform 410 an identification string exchange with a third party challenge, such as described above in connection with FIG. 3. As part of the identification string exchange with a third party challenge, the authentication service 406 may generate or otherwise obtain a challenge and transmit 412 the challenge to the server 404 for providing to the client 402, such as described above. The client 402 and server 404 may perform 414 an SSH algorithm negotiation and perform 406 an SSH key exchange also.

As also illustrated in FIG. 3, the client 402 may generate and transmit 418 an authentication request using the challenge. The client 402 and server 404 may perform an SSH key re-exchange, such as in accordance with RFC 4253. In this manner, despite being provided the protocol transcript which includes a negotiated cryptographic key, the authentication service 406 is unable to decrypt communications between the client 402 and server 404 after the re-exchange. Note that, in some embodiments, the server 404 is configured to trigger initiation of the key re-exchange upon receipt 420 of the authentication request, such as using an SSH_MSG_KEXINIT message to the client 402. In other embodiments, the client 402 is configured (e.g., with executable instructions) to trigger initiation of the key re-exchange upon receipt 420 of the authentication request, such as using an SSH_MSG_KEXINIT message to the server 404. In some examples, both the client 402 and the server are both configured to initiate key re-exchange after the authentication request has been made and either can initiate the key-re-exchange. In this manner, the client 402 and server 404 can communicate by encrypting communications that the authentication service 406 or any entity with access to the authentication service 406 are unable to decrypt without extraordinary computational effort.

As shown in FIG. 4, as with FIG. 3, the server 404 also transmits 424 a signature verification request to the authentication service 406. As noted in FIG. 3, the signature verification request may include the protocol transcript or, generally, the data over which the client would have generated the digital signature for the digital signature to be correct. The authentication service 406 may then verify 426, the signature, and the authentication service 426 may also generate and transmit 428 a signature verification response 430, such as described above in connection with FIG. 3. The server 404 may operate 428 in accordance with the verification response, such as described above.

Figure 5:
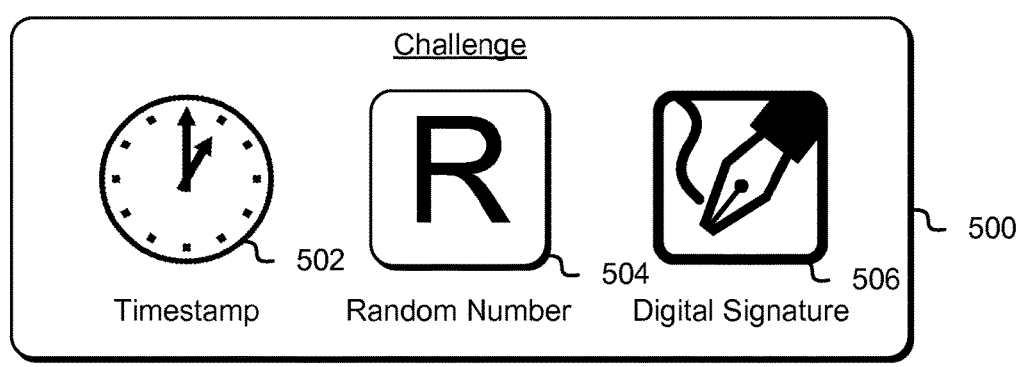
FIG. 5 shows an illustrative example of a challenge that may be used in accordance with various embodiments of the present disclosure.

FIG. 5 shows an illustrative example of a challenge 500 that may be generated or otherwise obtained by an authentication service in accordance with an embodiment. In this example, the challenge 500 comprises three values: a timestamp 502, a random number 504, and a digital signature 506. In an embodiment, the timestamp 502 is a value indicting a time of creation of the challenge 500. The timestamp may be, for instance, a Unix timestamp or another value indicative of a time (relative to some reference time) the challenge 500 is created. Note that other values may also be used instead of or in addition to a timestamp, such as an expiration time or a non-temporal value, such as a nonce or sequence value. In this last example, an authentication service may maintain a database that can be used to determine whether this value is sufficiently recent when presented in a signature verification request. Note however, that timestamps enable temporal freshness to be determined without maintaining such a database.

The random number 504 may be generated by a pseudo-random number generator and may be included to prevent certain types of cryptographic attacks based on access to one or more challenges. The digital signature may be calculated over data that includes the timestamp 502 and the random number 504. Further, the digital signature 506 may be calculated using a cryptographic key maintained as a secret by the authentication service and inaccessible outside of the authentication service. For instance, the digital signature 506 may be a message authentication code generated based at least in part on the timestamp, the random number, and a symmetric cryptographic key maintained as a secret by the authentication service. In this manner, when the authentication service receives the challenge in a signature verification request, the authentication service can cryptographically verify whether the challenge has been modified. Note that while FIG. 5 shows a particular example of a challenge, other configurations are also considered as being within the scope of the present disclosure.

Figure 6:
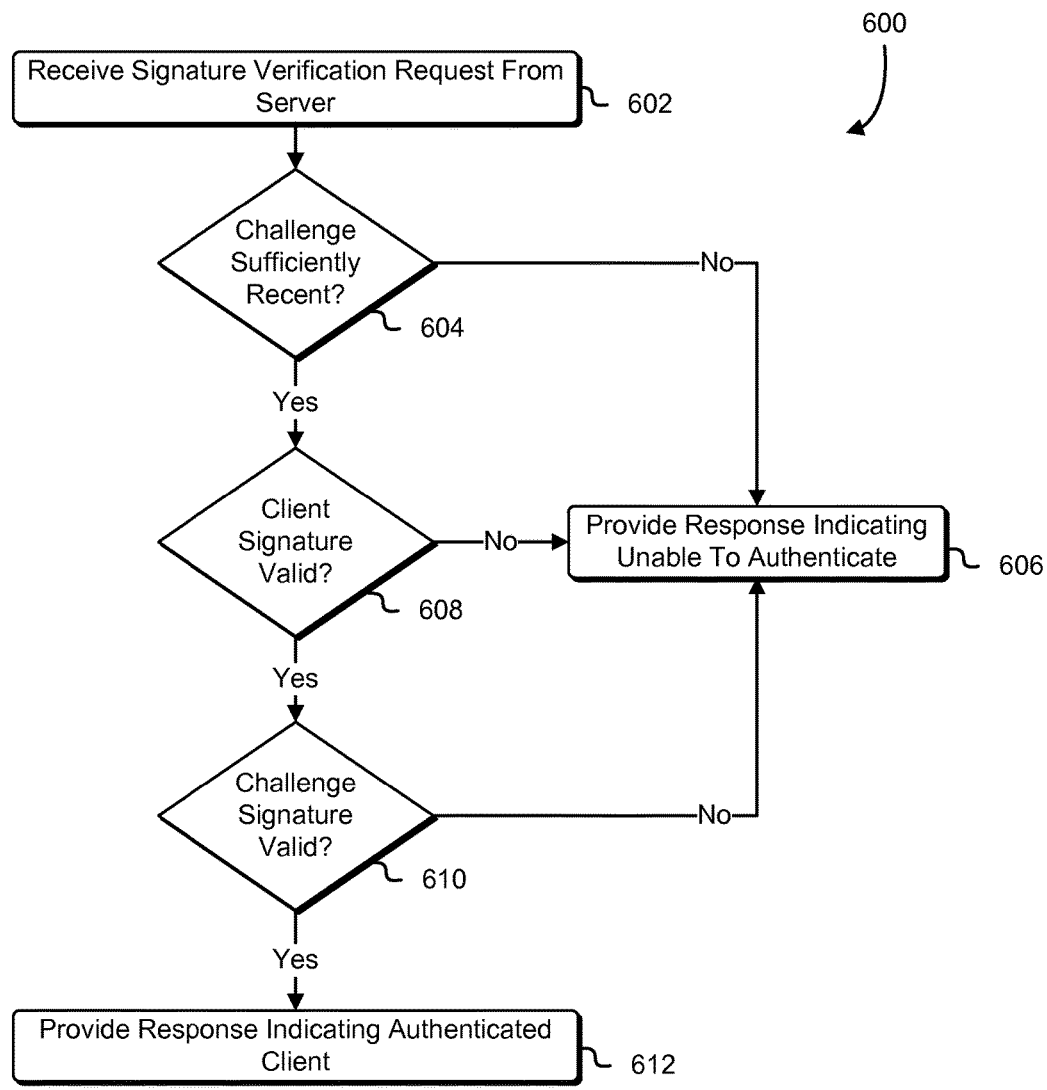
FIG. 6 shows an illustrative example of a process for verifying a digital signature in accordance with an embodiment.

FIG. 6 shows an illustrative example of a process 600 that can be used to process a signature verification request in accordance with an embodiment. The process 600 may be performed by any suitable system, such as a server of an authentication service, such as described above. In an embodiment, the process 600 includes receiving a signature verification request from a server, such as described above. The signature verification request may include a challenge which, as noted above, may include a timestamp or other value indicative of temporal freshness. To process the signature verification request, the system performing the process 600 may determine 604 whether the challenge is sufficiently recent, such as by comparing a timestamp of the challenge with a current timestamp and determining whether the difference in times is within a threshold or by looking up the value in a database, as noted above.

In this example, if the system performing the process 600 determines 604 that the challenge is not sufficiently recent, the system may provide 606 a response to the received 602 request indicating that the system was unable to successfully authenticate the client (i.e., that the system was unable to successfully verify the digital signature). In some embodiments, such a response may indicate one or more reasons for the failure. If, however, the system determines 604 that the challenge is sufficiently recent, the system verifies the client digital signature and determines 608 whether the client digital signature is valid, where the client digital signature is the digital signature of an authentication claim included in the signature verification request. If determined 608 that the client digital signature is invalid, the system performing the process 600 may provide 606 a response indicating a failure to authenticate the client, such as described above.

If, however, the system performing the process 600 determines 608 that the client digital signature is valid, the system may determine 610 whether the challenge signature (e.g., the digital signature 506 in FIG. 5) is valid to determine whether the challenge itself is valid and not forged. If determined 608 that the challenge digital signature is invalid, the system performing the process 600 may provide 606 a response indicating a failure to authenticate the client, such as described above. If, however, the system performing the process 600 determines 608 that the client digital signature is valid, the system may provide 612 a response that indicates that the client has been successfully authenticated. Other operations may also be performed for such a response, such as generating or otherwise obtaining a forward access session token to include with the response.

Note that, while FIG. 6 shows three separate determinations being made in sequence, the determinations may be made in a different order and two or more of the determinations may be made in parallel. Note also that additional operations may be performed, such as those operations discussed above in connection with FIG. 3 regarding verification of a signature verification request, such as determining whether the cryptographic keys involved in the determinations are trusted, calculating data to establish a cryptographic binding between the challenge and the digital signature being verified, and/or other operations.

Figure 7:
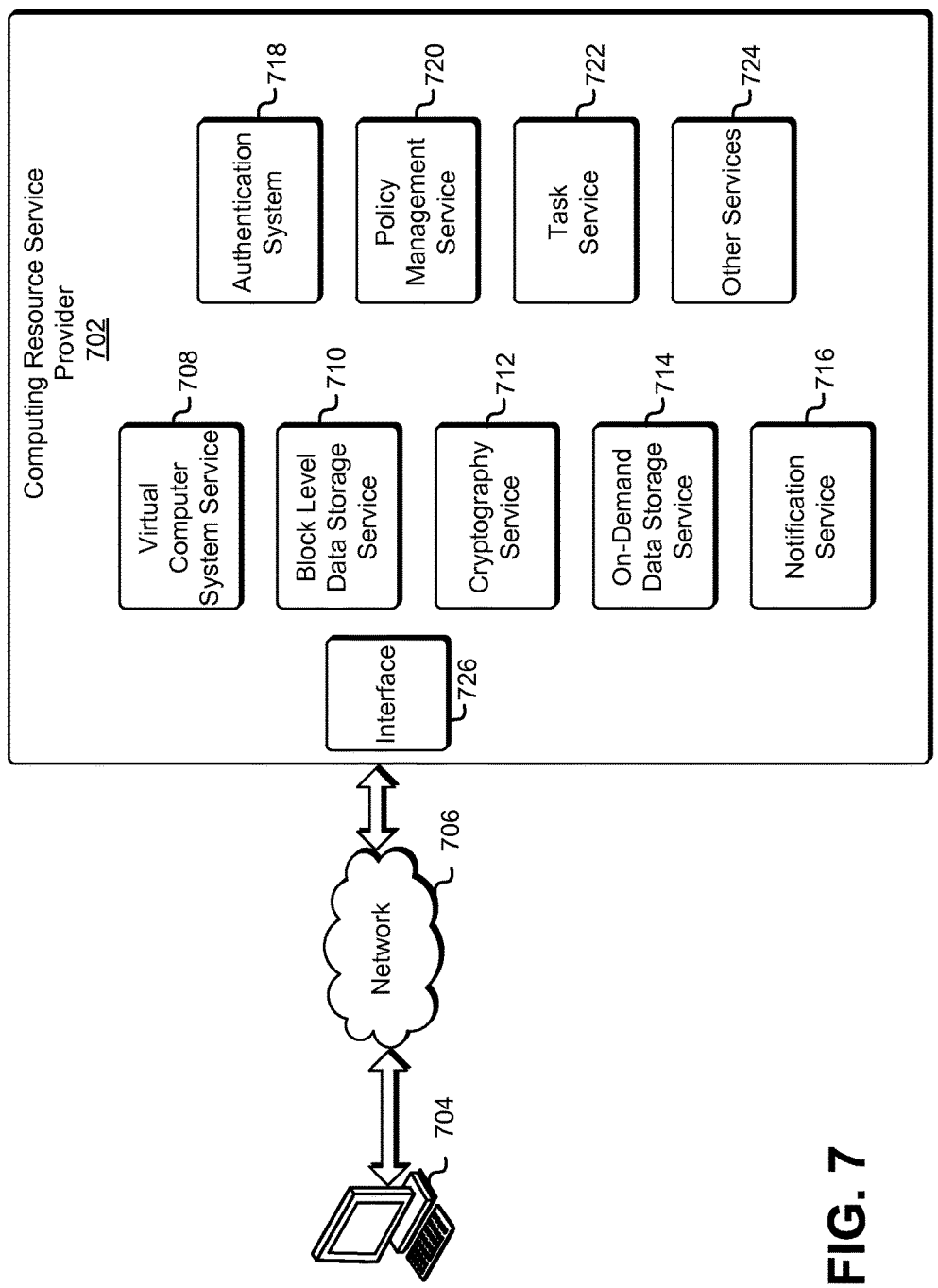
FIG. 7 shows an illustrative example of an environment in which various embodiments can be implemented.

FIG. 7 shows an example of a customer connected to a computing resource service provider that may utilize various techniques described herein. The computing resource service provider 702 may provide a variety of services to the customer 704 and the customer 704 may communicate with the computing resource service provider 702 via an interface 726, which may be a web services interface or any other type of customer interface. While FIG. 7 shows one interface 726 for the services of the computing resource service provider 702, each service may have its own interface and, generally, subsets of the services may have corresponding interfaces in addition to or as an alternative to the interface 726. The customer 704 may be an organization that may utilize one or more of the services provided by the computing resource service provider 702 to maintain and deliver information to its employees, which may be located in various geographical locations. Additionally, the customer 704 may be an individual that utilizes the services of the computing resource service provider 702 to deliver content to a working group located remotely. As shown in FIG. 7, the customer 704 may communicate with the computing resource service provider 702 through a network 706, whereby the network 706 may be a communication network, such as the Internet, an intranet or an Internet service provider (ISP) network. Some communications from the customer 704 to the computing resource service provider 702 may cause the computing resource service provider 702 to operate in accordance with one or more embodiments described herein or a variation thereof.

The computing resource service provider 702 may provide various computing resource services to its customers. Such services may be configured such as described above in connection with FIG. 2. The services provided by the computing resource service provider 702, in this example, include a virtual computer system service 708, a block-level data storage service 710, a cryptography service 712, an on-demand data storage service 714, a notification service 716, an authentication service 718, an identity and policy management service 720, a task service 722 and one or more other services 724. It is noted that not all embodiments described herein include the services 708-724 described with reference to FIG. 7 and additional services may be provided in addition to or as an alternative to services explicitly described herein. As described herein, each of the services 708-724 may include one or more web service interfaces that enable the customer 704 to submit appropriately configured API calls to the various services through web service requests. In addition, each of the services may include one or more service interfaces that enable the services to access each other (e.g., to enable a virtual computer system of the virtual computer system service 708 to store data in or retrieve data from the on-demand data storage service 714 and/or to access one or more block-level data storage devices provided by the block level data storage service 710).

The virtual computer system service 708 may be a collection of computing resources configured to instantiate virtual machine instances on behalf of the customer 704. The customer 704 may interact with the virtual computer system service 708 (via appropriately configured and authenticated API calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 708 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices. Note that, in some embodiments, operations described above as being performed by an authentication service, may be performed by a virtual computer system of the customer hosted by the service provider 702 in the virtual computer system service 708.

The block-level data storage service 710 may comprise one or more computing resources that collectively operate to store data for a customer 704 using block-level storage devices (and/or virtualizations thereof). The block-level storage devices of the block-level data storage service 710 may, for instance, be operationally attached to virtual computer systems provided by the virtual computer system service 708 to serve as logical units (e.g., virtual drives) for the computer systems. A block-level storage device may enable the persistent storage of data used/generated by a corresponding virtual computer system where the virtual computer system service 708 may only provide ephemeral data storage.

The computing resource service provider 702 also includes a cryptography service 712. The cryptography service 712 may utilize one or more storage services of the computing resource service provider 702 to store keys of the customers in encrypted form, whereby the keys may be usable to decrypt customer 712 keys accessible only to particular devices of the cryptography service 712. Note that, in some embodiments, the cryptography service may obtain and provide challenges and perform digital signature verification described above in connection with the authentication service.

The computing resource service provider 702 further includes an on-demand data storage service 714. The on-demand data storage service 714 may be a collection of computing resources configured to synchronously process requests to store and/or access data. The on-demand data storage service 714 may operate using computing resources (e.g., databases) that enable the on-demand data storage service 714 to locate and retrieve data quickly, so as to allow data to be provided in responses to requests for the data. For example, the on-demand data storage service 714 may maintain stored data in a manner such that, when a request for a data object is retrieved, the data object can be provided (or streaming of the data object can be initiated) in a response to the request. As noted, data stored in the on-demand data storage service 714 may be organized into data objects. The data objects may have arbitrary sizes except, perhaps, for certain constraints on size. Thus, the on-demand data storage service 714 may store numerous data objects of varying sizes. The on-demand data storage service 714 may operate as a key value store that associates data objects with identifiers of the data objects that may be used by the customer 704 to retrieve or perform other operations in connection with the data objects stored by the on-demand data storage service 714.

In the environment illustrated in FIG. 7, a notification service 716 is included. The notification service 716 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 716 may provide notifications to clients using a "push" mechanism without the need to periodically check or "poll" for new information and updates. The notification service 716 may further be used for various purposes such as monitoring applications executing in the virtual computer system service 708, workflow systems, time-sensitive information updates, mobile applications, and many others.

As illustrated in FIG. 7, the computing resource service provider 702, in various embodiments, includes an authentication service 718 and an identity and policy management service 720. The authentication service 718, in an embodiment, is a computer system (i.e., collection of computing resources) configured to perform operations involved in authentication of users of the customer. For instance, one of the services 708-716 and 720-724 may provide information from a user to the authentication service system 718 to receive information in return that indicates whether or not the user requests are authentic.

The identity and policy management service 720, in an embodiment, is a computer system configured to manage policies on behalf of customers (such as customer 704) of the computing resource service provider 702. The identity and policy management service 720 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 702, in various embodiments, is also equipped with a task service 722. The task service 722 is configured to receive a task package from the customer 704 and enable executing tasks as dictated by the task package. The task service 722 may be configured to use any resource of the computing resource service provider 702, such as one or more instantiated virtual machines or virtual hosts, for executing the task. The task service 724 may configure the one or more instantiated virtual machines or virtual hosts to operate using a selected operating system and/or a selected execution application in accordance with a requirement of the customer 704.

The computing resource service provider 702 additionally maintains one or more other services 724 based at least in part on the needs of its customers 704. For instance, the computing resource service provider 702 may maintain a database service for its customers 704. A database service may be a collection of computing resources that collectively operate to run one or more databases for one or more customers 704. The customer 704 may operate and manage a database from the database service by utilizing appropriately configured API calls. This, in turn, may allow a customer 704 to maintain and potentially scale the operations in the database. Other services include, but are not limited to, object-level archival data storage services, services that manage and/or monitor other services. In some examples, the other services 724 include a software development service that provides a Git repository hosting service which offers distributed revision control and source code functionality of Git in addition to other features.

Figure 8:
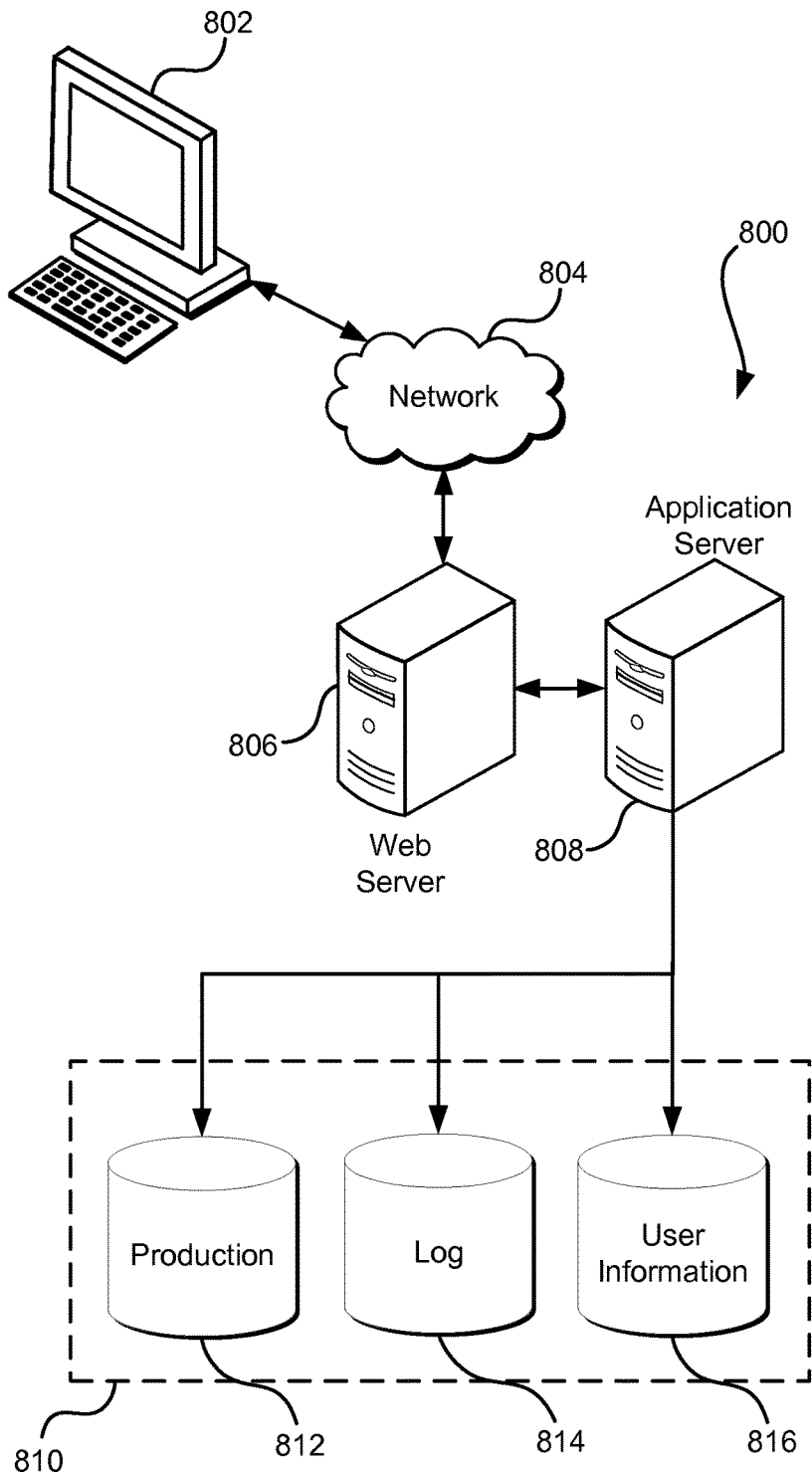
FIG. 8 illustrates an environment in which various embodiments can be implemented and which may be incorporated into the environment shown in FIG. 7.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a challenge from an authentication service;
   generating a secure shell (SSH) identification string that comprises the obtained challenge;
   transmitting the generated SSH identification string to another computer system during an SSH identification string exchange;
   receiving, from the other computer system, after an SSH key exchange with the other computer system, an SSH authentication request that comprises a digital signature;
   transmitting to the authentication service the digital signature and information usable to determine a set of messages passed between the computer system and the other computer system, at least one message of the set of messages comprising the challenge;
   receiving, from the authentication service, a response that indicates whether the digital signature was successfully verified as having been generated using the challenge; and
   authenticating the other computer system based at least in part on the received response.

2. The computer-implemented method of claim 1, wherein:
   the response indicates successful verification of the digital signature and includes a token that serves as cryptographic proof that the computer system is authorized to submit at least one request on behalf of the other computer system; and
   the method further comprises using the token to make a request to another service on behalf of the other computer system.

3. The computer-implemented method of claim 1, wherein the generated identification string comprises the challenge in a comment field of the generated SSH identification string.

4. The computer-implemented method of claim 1, wherein the challenge comprises a timestamp and message authentication code generated by the authentication service.

5. The computer-implemented method of claim 1, further comprising, as a result of receiving the SSH authentication request, initiating a second SSH key exchange.

6. A system, comprising:
   one or more processors; and
   memory to store computer-executable instructions that, if executed, cause the one or more processors to:
     obtain a challenge from an authentication service;
     generate a secure shell (SSH) identification string that comprises the obtained challenge;
     transmit the generated SSH identification string to another computer system during an SSH identification string exchange;
     receive, from the other computer system, after an SSH key exchange with the other computer system, an SSH authentication request that comprises a digital signature;
     transmit to the authentication service the digital signature and information usable to determine a set of messages passed between the computer system and the other computer system, at least one message of the set of messages comprising the challenge;
     receive, from the authentication service, a response that indicates whether the digital signature was successfully verified as having been generated using the challenge; and
     authenticate the other computer system based at least in part on the received response.

7. The system of claim 6, wherein the SSH identification string is configured in accordance with an SSH protocol.

8. The system of claim 6, further comprising the authentication service.

9. The system of claim 8, wherein the authentication service is configured to generate the challenge such that the challenge includes a digital signature generated by the authentication service.

10. The system of claim 9, wherein the authentication service is configured to:
    verify the authentication request, at least in part, by verifying the digital signature generated by the authentication service; and
    provide information, in response to verifying the authentication request, usable by the system to make application programming interface calls on behalf on an entity associated with the other computer system.

11. The system of claim 6, wherein:
    the SSH authentication request specifies a cryptographic key;
    the other computer system is configured to trust the cryptographic key; and
    the instructions, if executed, further cause the one or more processors to provide an application programming interface through which trust of the cryptographic key by the other system can be managed through the submission of application programming interface calls.

12. The system of claim 6, wherein the challenge has information usable to determine an interval of time during which the challenge can be used for authentication requests.

13. The system of claim 6, wherein:
the SSH identification strings comprises information to negotiate a version of an SSH protocol.

14. The system of claim 6, wherein the instructions, if executed, cause the one or more processors to:
obtain the challenge by submitting a first application programming interface call to the authentication service; and
cause the authentication service to verify the authentication request by submitting a second application programming interface call to the authentication service.

15. The system of claim 6, wherein instructions, if executed, further cause the one or more processors to:
prior to receipt of the authentication request, determine a first cryptographic key for encrypting communications; and
as a result of receiving the authentication request, determine a second cryptographic key to replace the first cryptographic key.

16. The system of claim 6, wherein:
the system further comprises the other computer system; and
the other computer system is configured to:
use a set of parameters in the challenge to determine whether the challenge is valid; and
submit the authentication request on a condition that the challenge is determined to be valid.

17. A non-transitory computer-readable storage medium having stored thereon executable instructions that, as a result of execution by one or more processors of a computer system, cause the computer system to at least:
obtain a challenge from an authentication service;
generate a secure shell (SSH) identification string that comprises the obtained challenge;
transmit the generated SSH identification string to another computer system during an SSH identification string exchange;
receive, from the other computer system, after an SSH key exchange with the other computer system, an SSH authentication request that comprises a digital signature;
transmit to the authentication service the digital signature and information usable to determine a set of messages passed between the computer system and the other computer system, at least one message of the set of messages comprising the challenge;
receive, from the authentication service, a response that indicates whether the digital signature was successfully verified as having been generated using the challenge; and
authenticate the other computer system based at least in part on the received response.

18. The non-transitory computer-readable storage medium of claim 17, wherein is the instructions further cause the computer system to establish a secure shell (SSH) session with the other computer system.

19. The non-transitory computer-readable storage medium of claim 17, wherein the identification string identifies a version of an SSH protocol.

20. The non-transitory computer-readable storage medium of claim 19, wherein the challenge is in a comment field of the identification string.

21. The non-transitory computer-readable storage medium of claim 17, wherein the instructions further cause the computer system to use a credential provided by the other computer system to submit a request on behalf of an entity associated with the other computer system.

22. The non-transitory computer-readable storage medium of claim 17, wherein the instructions further comprise instructions that, as a result of execution by the one or more processors, cause the computer system to initiate a key exchange as a result of the authentication request having been received.

23. The non-transitory computer-readable storage medium of claim 17, wherein the information usable to determine the set of messages comprises a protocol transcript.

\* \* \* \* \*